(12) United States Patent
Kido

(10) Patent No.: US 8,951,112 B2
(45) Date of Patent: Feb. 10, 2015

(54) GAMING MACHINE

(75) Inventor: Katsuhiro Kido, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 99 days.

(21) Appl. No.: 13/354,519

(22) Filed: Jan. 20, 2012

(65) Prior Publication Data

US 2012/0208621 A1    Aug. 16, 2012

(30) Foreign Application Priority Data

Feb. 15, 2011 (JP) ................. 2011-030114

(51) Int. Cl.
*G07F 17/32* (2006.01)
*G06F 3/0488* (2013.01)

(52) U.S. Cl.
CPC ........ *G06F 3/04883* (2013.01); *G06F 3/04886* (2013.01); *G07F 17/3209* (2013.01)
USPC ................... 463/25; 463/16; 463/17; 463/18; 463/19; 463/20; 463/36; 463/37

(58) Field of Classification Search
USPC .................................. 463/16–20, 25, 36–37
See application file for complete search history.

(56) References Cited

U.S. PATENT DOCUMENTS

| | | | | |
|---|---|---|---|---|
| 2002/0090990 A1* | 7/2002 | Joshi et al. | ...... | 463/20 |
| 2003/0064781 A1* | 4/2003 | Muir | ...... | 463/20 |
| 2004/0259627 A1* | 12/2004 | Walker et al. | ...... | 463/20 |
| 2005/0170876 A1* | 8/2005 | Masci et al. | ...... | 463/16 |
| 2005/0242505 A1* | 11/2005 | Reiner et al. | ...... | 273/292 |
| 2007/0265061 A1* | 11/2007 | Marks et al. | ...... | 463/20 |
| 2009/0117965 A1* | 5/2009 | Tsukahara | ...... | 463/17 |
| 2009/0176451 A1* | 7/2009 | Yang et al. | ...... | 455/41.2 |
| 2010/0075744 A1* | 3/2010 | Baratti et al. | ...... | 463/22 |
| 2010/0148442 A1* | 6/2010 | Walker et al. | ...... | 273/274 |
| 2011/0115737 A1 | 5/2011 | Fuyuno et al. | | |
| 2012/0030566 A1* | 2/2012 | Victor | ...... | 715/702 |
| 2012/0202581 A1* | 8/2012 | Bennett et al. | ...... | 463/20 |

FOREIGN PATENT DOCUMENTS

| | | |
|---|---|---|
| JP | 6161661 | 6/1994 |
| JP | 9212300 | 8/1997 |
| JP | 2008-084232 | 4/2008 |
| JP | 2008-310521 | 12/2008 |
| WO | 2010-010835 | 1/2010 |

\* cited by examiner

*Primary Examiner* — Jasson Yoo
(74) *Attorney, Agent, or Firm* — Lexyoume IP Meister, PLLC

(57) ABSTRACT

A display device having bet areas where a plurality of bet objects are displayed and a unit bet buttons where a plurality of bet amounts are displayed and a touch panel which is provided on the front surface side of the display device to be able to receive a touch input from the outside and detect a touched position of the touch input are included. When the touched position of the touch input corresponds to any bet amounts in the unit bet buttons, a bet amount is determined based on this touched position. When the touched position of the touch input continuously moves at least in the bet areas, betting on each bet object on the moving path among the bet objects in the bet areas is received with the bet amount determined using the unit bet button.

8 Claims, 16 Drawing Sheets

FIG.7

PAYOUT ODDS TABLE

| BET TYPE | PAYOUT RATE |
| --- | --- |
| SMALL BET(UNDER 11) | 1 WINS 1 |
| SPECIFIC TRIPLE | 1 WINS 190 |
| ANY TRIPLE | 1 WINS 31 |
| ANY DOUBLE | 1 WINS 12 |
| BIG BET(OVER 10) | 1 WINS 1 |
| TOTAL = 4 | 1 WINS 62 |
| TOTAL = 5 | 1 WINS 31 |
| TOTAL = 6 | 1 WINS 18 |
| TOTAL = 7 | 1 WINS 12 |
| TOTAL = 8 | 1 WINS 8 |
| TOTAL = 9 | 1 WINS 7 |
| TOTAL = 10 | 1 WINS 6 |
| TOTAL = 11 | 1 WINS 6 |
| TOTAL = 12 | 1 WINS 7 |
| TOTAL = 13 | 1 WINS 8 |
| TOTAL = 14 | 1 WINS 12 |
| TOTAL = 15 | 1 WINS 18 |
| TOTAL = 16 | 1 WINS 31 |
| TOTAL = 17 | 1 WINS 62 |
| PAIR MATCH | 1 WINS 6 |
| NUMBERS-SINGLE | 1 WINS 1 |
| NUMBERS-DOUBLE | 1 WINS 2 |
| NUMBERS-TRIPLE | 1 WINS 12 |

GAMING MACHINE

CROSS REFERENCE TO RELATED APPLICATION

The present application claims priority from Japanese Patent Application No. 2011-030114, which was filed on Feb. 15, 2011, the disclosure of which is herein incorporated by reference in its entirety.

BACKGROUND OF THE INVENTION

1. Field of the Invention

The present invention relates to a gaming machine in which a bet is input through a touch panel.

2. Description of Related Art

Known input devices for making inputs to various devices are arranged such that a touch panel is mounted to cover a display device, the point of a touch input into the touch panel is detected, and an input signal corresponding to the point is received (Japanese Unexamined Patent Publication No. 6-161661, Japanese Unexamined Patent Publication No. 9-212300, Japanese Unexamined Patent Publication No. 2008-310521, Japanese Unexamined Patent Publication No. 2008-084232, and a Pamphlet of International Publication No. 2010/010835A1).

In this connection, there have recently been gaming machines which allow users to make betting by a touch input into the above-described touch panel device. In gaming machines for playing games such as roulette and Sic Bo in which a plurality of players bet on a single object, bets are typically accepted only during a limited period. Such gaming machines involve a problem in that, because there are typically more than one bet objects, players may not be able to bet on more than one bet objects during a limited bet period.

An object of the present invention is therefore to provide a gaming machine which allows a player to quickly bet on a plurality of bet objects within a limited bet period.

SUMMARY OF THE INVENTION

A gaming machine of the present invention includes: a display device which has a bet object display area where a plurality of bet objects are displayed and further has a bet amount display area where a plurality of bet amounts are displayed; a touch panel which is provided on the front surface side of the display device to be able to receive a touch input from the outside and detect a touched position of the touch input; and a controller which is programmed to execute the processes of:

(a1) when the touched position of the touch input corresponds to any of the bet amounts in the bet amount display area, determining a bet amount based on the touched position; and (a2) when the touched position of the touch input continuously moves at least in the bet object display area, receiving betting on each of bet objects which are on a moving path of the touched position among the bet objects in the bet object display area, with the bet amount determined in the process (a1).

According to this arrangement, by continuously moving a touched position within the bet object display area, it is possible to make betting on a plurality of bet objects on the moving path with a bet amount having been determined. As such, it is possible to make betting on a plurality of bet objects with a single operation, after the bet amount is determined. This makes it possible to bet on a plurality of bet objects with a simple operation, in a gaming machine which typically requires a bet operation within a limited time. This allows the player to quickly make betting on a plurality of bet objects within a limited bet period.

The gaming machine of the present invention is further arranged so that the display device further includes a cancellation operation area, and the controller further executes the processes of:

(a3) determining whether the touched position locates in the cancellation operation area; and (a4) if the touched position by the touch input continuously moves at least in the bet object display area after it is determined that the touched position locates in the cancellation operation area, receiving cancellation of the betting on each of bet objects which are on a moving path of the touched position among the bet objects in the bet object display area.

According to this arrangement, by continuously moving the touched position in the bet object display area after the cancellation operation area is touched, betting on a plurality of bet objects on the moving path is cancelled. As such, by a simple operation, it is possible to cancel betting having been made on the bet objects.

In addition to the above, the gaming machine of the present invention is further arranged so that the controller executes the process of:

(a5) displaying, on the display device, a total of the bet amounts received in the process (a2).

According to this arrangement, since the total of the bet amounts of the received bets is displayed, the player can make betting while checking the bet amount resulting from betting on a plurality of bet objects made at once.

The present invention allows the player to quickly make betting on a plurality of bet objects within a limited bet period.

BRIEF DESCRIPTION OF THE DRAWINGS

FIG. 7 shows a payout odds table.

DESCRIPTION OF THE PREFERRED EMBODIMENTS (Outline of Gaming Machine)

Figure 1:
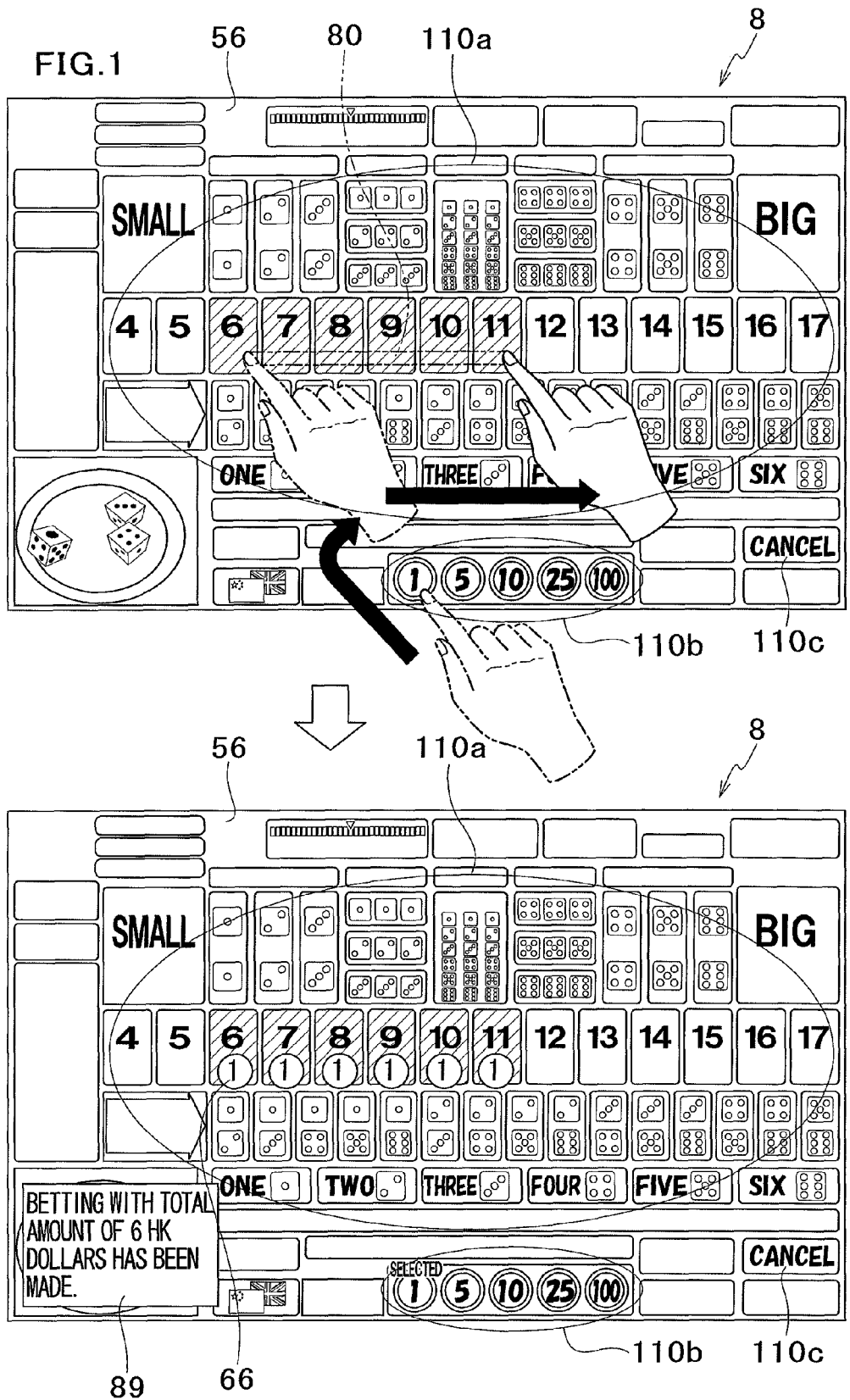
FIG. 1 provides an outline of a gaming machine.
Figure 2:
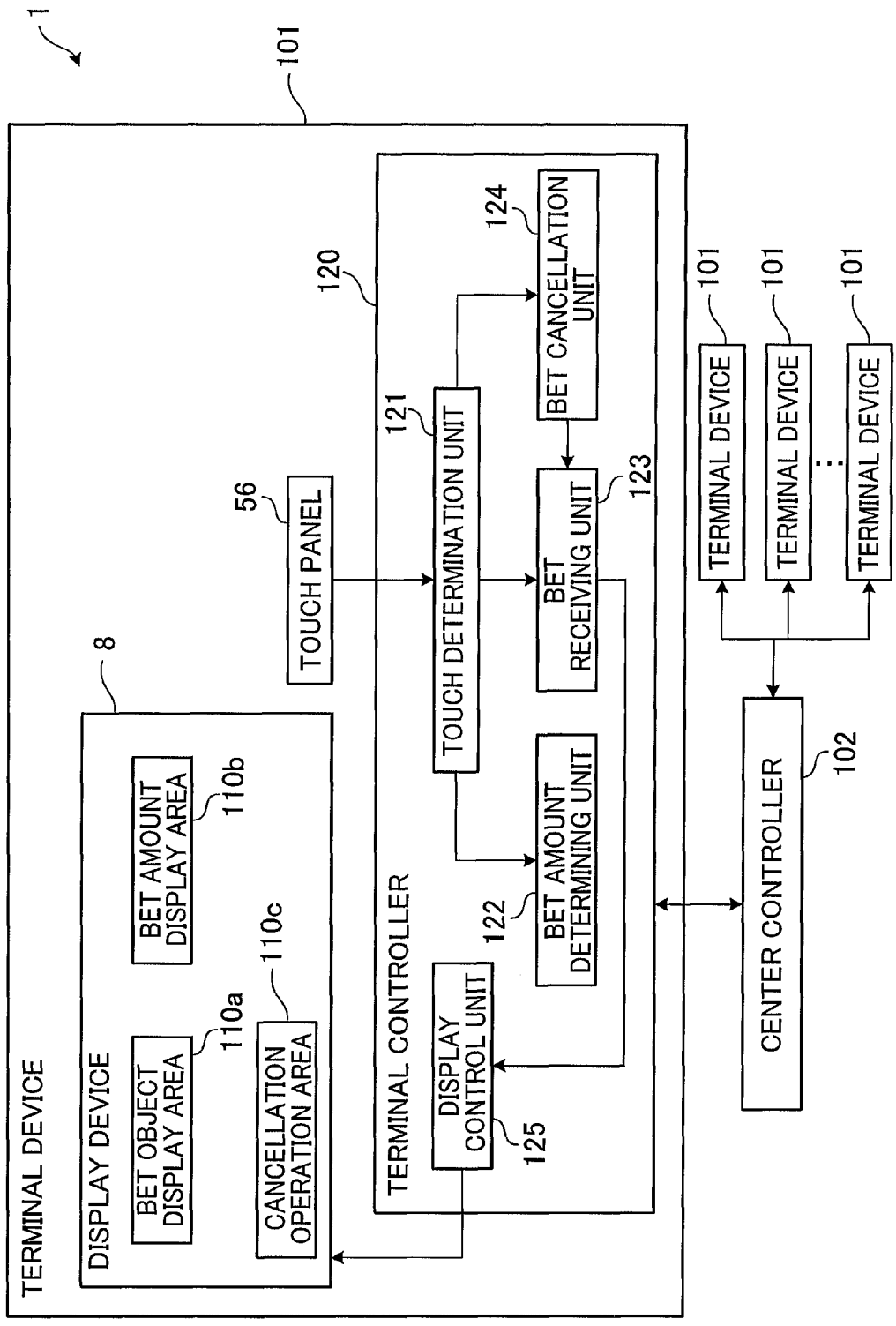
FIG. 2 is a block diagram of a gaming machine.

As shown in FIG. 1 and FIG. 2, a gaming machine 1 has a first arrangement so as to include a bet object display area 110*a* where a plurality of bet objects are displayed, a display (display device) 8 having a bet amount display area 110*b* where a plurality of bet amounts are displayed, a touch panel 56 which is provided on the front surface side of the display device 8 to be able to receive a touch input from the outside and detect a touched position corresponding to the touch input, and a terminal controller (controller) 120.

The terminal controller 120 of the gaming machine 1 of the first arrangement is programmed so that, the terminal controller 120 executes, when a touched position of a touch input corresponds to one of the bet amounts in the bet amount display area 110*b*, a process (a1) of determining the bet amount based on the touched position, and also executes, when the touched position of the touch input continuously moves at least in the bet object display area 110*a*, a process (a2) of receiving the betting with the determined bet amount on each of the bet objects on the moving path 80 among all bet objects in the bet object display area 110*a*.

The term "touch input" indicates a state where a player is touching the touch panel by his/her finger, a touch pen, or the like. The term "touched position" is not limited to a range of contact onto the touch panel by a touch input. The term may indicate a range wider than the contact range above or may indicate a range narrower than the contact range above. The phrase "the touched position continuously moves" indicates that a finger of the player, a touch pen, or the like moves from an initial position of touching the touch panel to another position while keeping in touch with the touch panel. In other words, the trace formed by continuous contact from the initial position to another position is the moving path.

According to the first arrangement, by continuously moving a touched position within a bet object display area, it is possible to make betting on a plurality of bet objects on the moving path 80 with a bet amount having been determined. As such, it is possible to make betting on a plurality of bet objects with a single operation, after the bet amount is determined. This makes it possible to bet on a plurality of bet objects with a simple operation, in a gaming machine which typically requires a bet operation within a limited time. This allows the player to quickly make betting on a plurality of bet objects within a limited bet period.

In addition to the first arrangement, the gaming machine 1 may have a second arrangement so as to be programmed to execute the following processes: (a3) the display device 8 includes a cancellation operation area 110*c* and the terminal controller 120 determines whether the touched position is in the cancellation operation area 110*c*; and (a4) when the touched position of the touch input continuously moves at least in the bet object display area 110*a* after it is determined that the touched position is in the cancellation operation area, cancellation of betting on each bet object on the moving path among the bet objects in the bet object display area 110*a* is accepted.

According to the second arrangement, when the touched position is continuously moved in the bet object display area 110*a* after the cancellation operation area 110*c* is touched, betting on a plurality of bet objects on the moving path is cancelled. As such, by a simple operation, it is possible to cancel betting having been made on the bet objects.

In addition to the first or second arrangement above, the gaming machine 1 may have a third arrangement so as to be programmed to execute a process (a5) of displaying, on the display device 8, the total of the bet amounts of the bets that the terminal controller 120 has received in the process (a2).

According to this arrangement, since the total of the bet amounts of the received bets is displayed on the display device 8, the player can make betting while checking the bet amount resulting from betting on a plurality of bet objects made at once.

(Functional Blocks of Gaming Machine 1)

The gaming machine 1 arranged as above includes, as shown in FIG. 2, a plurality of terminal devices 101 and a center controller 102 which is connected to the terminal devices 101 to be able to exchange data therewith. While the gaming machine 1 of the present embodiment is arranged so that the center controller 102 and the terminal devices 101 are integrated, each terminal device 101 may be independent from the center controller 102 as long as communications therebetween are possible.

(Terminal Device 101)

The terminal device 101 includes a display device 8, a touch panel 56, and a terminal controller 120. The display device 8 is arranged to display, as described above, a bet object display area 110*a*, a bet amount display area 110*b*, and a cancellation operation area 110*c*. The touch panel 56 is provided to cover at least these areas 110*a*, 110*b*, and 110*c* displayed on the display device 8, and has a function to detect a touched position of a touch input and outputs a touched position signal to the terminal controller 120.

The terminal controller 120 includes a touch determination unit 121, a bet amount determining unit 122, a bet receiving unit 123, a bet cancellation unit 124, and a display control unit 125.

The touch determination unit 121 has a function of determining in which area the touch input has been made, based on the touched position signal from the touch panel 56. Based on the area thus determined, a signal regarding the touch input (touched position) is output to one of the bet amount determining unit 122, the bet receiving unit 123, and the bet cancellation unit 124.

The bet amount determining unit 122 has a function of determining, when the bet amount display area 110*b* is operated, a bet amount based on the signal from the touch determination unit 121. In addition to the above, the bet cancellation unit 124 has a function of outputting, to the bet receiving unit 123, an instruction signal indicating that cancellation of betting is acceptable, based on the signal from the touch determination unit 121, when the cancellation operation area 110*c* is operated.

The bet receiving unit 123 has a function of controlling, when the bet object display area 110*a* is operated, the action of receiving betting. More specifically, the bet receiving unit 123 receives betting based on the signal from the touch determination unit 121, when betting is acceptable. Furthermore, when the instruction signal indicating that the cancellation of betting is acceptable is received, the bet receiving unit 123 receives the cancellation of betting based on the signal from the touch determination unit 121. This state of accepting cancellation is termed cancel mode.

The bet receiving unit 123 is arranged to be able to receive betting on or cancellation of betting on a plurality of bet objects. That is to say, when the signal from the touch determination unit 121 is generated on account of continuous movement (sliding operation) of the touched position in the bet object display area 110*a*, the bet receiving unit 123 selects the bet objects on this moving path and receives betting or cancellation of betting for these bet objects.

In addition to the above, the bet receiving unit 123 outputs bet information of the received bets to the display control unit 125. The display control unit 125 has a function of displaying the total of the bet amounts of the received bets on the display device 8, based on the bet information from the bet receiving unit 123.

Although not illustrated, the terminal device 101 includes components such as a functional unit of running a game based on the control signal from the center controller 102, a functional unit of awarding a payout based on the game result, and a storage unit which temporarily and/or permanently store information concerning the game (e.g., bet amount information, cancel mode information, and information of the total of the received bet amounts.

(Center Controller 102)

The center controller 102 has functions such as controlling synchronization of the terminal devices 101 (e.g., bet receiving time), receiving bet information from each terminal device 101, randomly determining which one of the bet objects is the winning bet object, displaying the random determination result, determining whether any of the received bets has been made on the winning bet object, and calculating a payout to the winning player.

The terminal controller 120 and the center controller 102 above may be embodied in hardware or software according to need.

(Operations of Gaming Machine 1)

The following will describe the operation of the gaming machine 1 constituted by the functional blocks above. In each terminal device 101, a bet receiving time starts when receiving a control signal from the center controller 102. In this bet receiving time, the touch determination unit 121 performs determination on a touched position at least in the areas 110a, 110b, and 110c.

That is to say, as a touch input is made on the bet amount display area 110b during this bet receiving time, a bet amount is determined by the bet amount determining unit 122. Then a touch input is made on the bet object display area 110a so that a bet object is selected by the bet receiving unit 123, and betting with the selected bet amount is received. When the touch input is a sliding operation and hence a plurality of bet objects are selected, bets on all of the selected bet objects with the determined bet amount are received. After receiving the betting, the total of the bet amounts of the betting received by the display control unit 125 is displayed.

Furthermore, if a touch input is made on the cancellation operation area 110c during the bet receiving time, the bet cancellation unit 124 sets a cancel mode, with the result that cancellation of betting becomes acceptable. When a touch input is made on the bet object display area 110a, the selection of the bet object is canceled. In the case where the touch input was a sliding operation and hence a plurality of bet objects have been selected, the selection of all bet objects is canceled.

The bet receiving time ends when a control signal is input from the center controller 102, and information indicating the received betting is output from each terminal device 101 to the center controller 102. The center controller 102 randomly determines which bet object is the winning object, displays the random determination result, determines whether each bet has been made on the winning object, calculates the payout, and sends these sets of information to each terminal device 101. Thereafter, the payout is awarded to each winning terminal device 101.

(Mechanical Structure of Gaming Machine 1)

Figure 3:
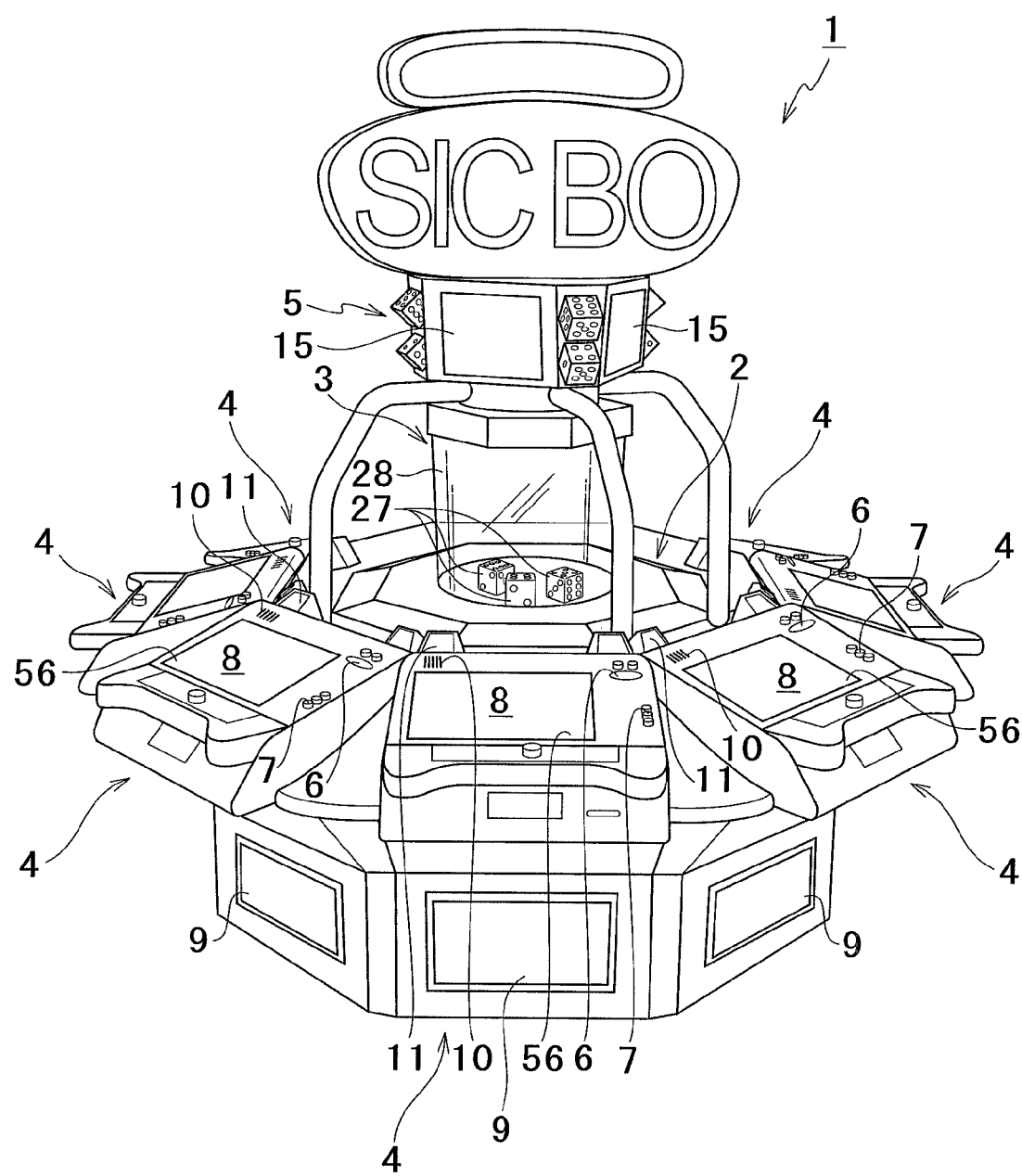
FIG. 3 is a perspective view showing an external appearance of a gaming machine.

The mechanical structure of the gaming machine 1 having the functions above will be specifically described. FIG. 3 is an external perspective view showing a schematic structure of a gaming machine 1 according to an embodiment. The gaming machine 1 has a cabinet 2, a Sic Bo unit 3, stations 4 and an electric display unit 5. The cabinet 2 fixes the Sic Bo unit 3, the stations 4, and the electric display unit 5 at predetermined positions and protects a device equipped therein such as electronic substrate. It is noted that the game in the present embodiment is Sic Bo, and the random determination of pips in Sic Bo is carried out by a Sic Bo unit 3.

It is noted that the present invention is not limited to the gaming machine running Sic Bo. For example, the gaming machine of the present invention may run roulette, baccarat, craps, or the like. The gaming machine of the present invention may be a gaming machine which includes a plurality of gaming terminals each independently running a slot game as a base game and runs the above-described game as a common game such as a bonus game in which the plurality of gaming terminals participate. In addition to the above, while the present embodiment employs a Sic Bo unit which mechanically throws three dices to determine the resulting pips in Sic Bo, the pips may be randomly determined and virtually displayed on a display device such as a display.

The Sic Bo unit 3 is provided substantially at the central portion of the upper surface of the cabinet 2. The stations 4 are equivalent to the terminal devices 101 in FIG. 2 and provided around the Sic Bo unit 3. More specifically, eight stations 4 are provided to surround the Sic Bo unit 3. Each station 4 includes a display device 8 and a touch panel 56, and receives a bet operation from a player. This bet operation will be detailed later.

The electric display unit 5 has four information displays 15. The information displays 15 are liquid crystal displays and provided to form the peripheral wall of the electric display unit 5. Thereby, the information displays 15 allow all players who play a game in the stations 4 to see the contents of display.

Figure 4:
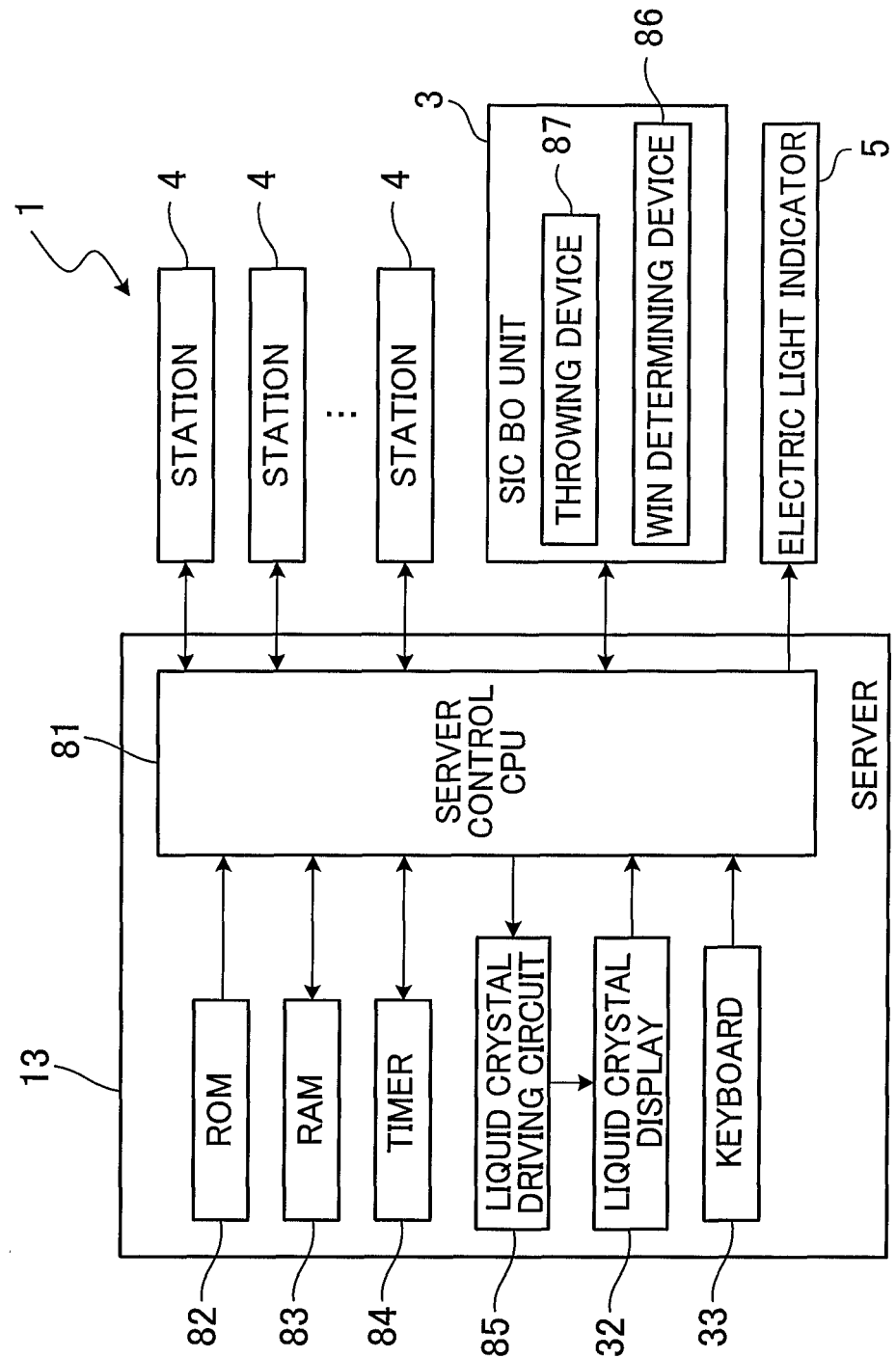
FIG. 4 is a block diagram schematically showing a control system of a gaming machine.

In addition to the above, the gaming machine 1 includes a server 13 (see FIG. 4). The server 13 is housed inside the cabinet 2. The cabinet 2 can be opened/shut by means of a cabinet door having an authentication key attached. The cabinet door is typically shut so that a player cannot operate the server 13. In the mean time, in the operation of the server 13, the cabinet door is opened by operating an authentication key. Thereby, the server 13 is operated from an outside of the cabinet 2, so that the gaming machine 1 can be variously set.

(Mechanical Structure: Sic Bo unit 3)

The structure of the Sic Bo unit 3 above will be described. As shown in FIG. 3, the Sic Bo unit 3 is covered by means of a hemisphere cover member 28 made of transparent acryl. The cover member 28 houses three dices 27. Although not illustrated, the Sic Bo unit 3 is provided with a throwing device 87 (see FIG. 4) for throwing the three dices 27 and a win determining device 86 (see FIG. 4) for reading the resulting pips of each of the three dices 27.

The throwing device 87 of the Sic Bo unit 3 may be variously arranged; for example, an uneven bottom surface is rotated or a bottom surface is vertically moved. Furthermore, the dices may be introduced from above.

The win determining device 86 of the Sic Bo unit 3 may also be variously arranged; for example, the win determining device 86 may be a reader having an antenna embedded below the internal bottom surface of the Sic Bo unit 3. In this case, a wireless tag for identifying each face is embedded in each face of the dices 27. With this, the win determining device 86 is able to read the wireless tag in the bottom surface of the dice 27 when the dice stops. Since the wireless tag on the bottom side indicates the opposite face, the reader is able to identify the pips (win number) of each dice.

(Mechanical Structure: Server 13)

As described above, the server 13 is provided inside the cabinet 2. The server 13 is associated with each station 4. The server 13 transmits a command signal to each of the stations 4 to initiatively control each station 4, thereby progressing a game. In addition, the server 13 performs a maintenance operation for the gaming machine 1, in addition to the control of a game of the gaming machine 1.

A liquid crystal display 32 and a keyboard 33 are associated with the server 13. The liquid crystal display displays a menu screen (not shown) or maintenance screen (not shown). In addition, the keyboard 33 is an operating means having several keys disposed thereon. In a state that a menu screen or maintenance screen is displayed on the liquid crystal display 32, when an operator operates the keyboard 33, the maintenance operation as well as various settings in the roulette gaming machine 1 can be made.

(Mechanical Structure: Station 4)

As shown in FIG. 3, the station 4 has a medal insertion slot 6, a control unit 7 and a display device 8. The medal insertion slot 6 is used to insert money or a game value used in a game such as chip, medal and the like. The control unit 7 has several operating parts such as control button and the like. The operating parts are used to input an instruction by a player. The display device 8 displays an image relating to a game and a bet screen that receives a bet operation of a player. Thereby, the display device 8 enables a player to operate the touch panel 56 or control unit 7 while seeing an image or bet screen.

The "game value" is a coin, bill, or electrically valuable information corresponding to these. Note that the game value in the present invention is not particularly limited. Examples of the game value include game media such as medals, tokens, cyber money, tickets, and the like. Further, the ticket is not particularly limited and may be a later-described ticket with a barcode or the like ticket.

The control unit 7 is disposed at a side of the display device 8. The control unit 7 has buttons each of which being operated by a player. To be more specific, the control unit 7 has a participation button 68 that is used to take part in a game, an end button 69 that ends a game, and a cancel button 70 to cancel all bets. The participation button 68, the end button 69 and the cancel button 70 are disposed in this order from the top, seen from a position opposite to the station 4.

The display device 8 is a liquid crystal display of a touch panel type having the touch panel 56 attached to a front thereof. When an icon displayed on the liquid crystal is pushed with a finger and the like, the icon is selected.

In addition, the respective stations 4 have medal payout slots 9, speakers 10 and win lamps 11. The medal payout slots 9 are disposed at the sides of the cabinet 2. The speakers 10 are disposed above a top-right of the display device 8. The win lamps 11 are disposed at sides of the speakers 10. The speakers 10 are used to output a music or effect music relating to a game. The win lamps 11 are turned on when a bet area bet on in the station 4 wins.

In the mean time, the win lamps 11 are disposed at positions that can be seen from all the stations 4 (8 stations in this embodiment). Thereby, the win lamps 11 enable another player to easily check a lighting state during the game in the same roulette gaming machine 1.

A medal sensor (not shown) is provided in the medal insertion slot 6. The medal sensor validates a medal inserted into the medal insertion slot 6 and counts the inserted medal. In addition, the medal payout slot 9 is connected to a hopper (not shown). The hopper pays out the predetermined number of medals from the medal payout slot 9.

(Electrical Structure: Server 13)

Figure 6:
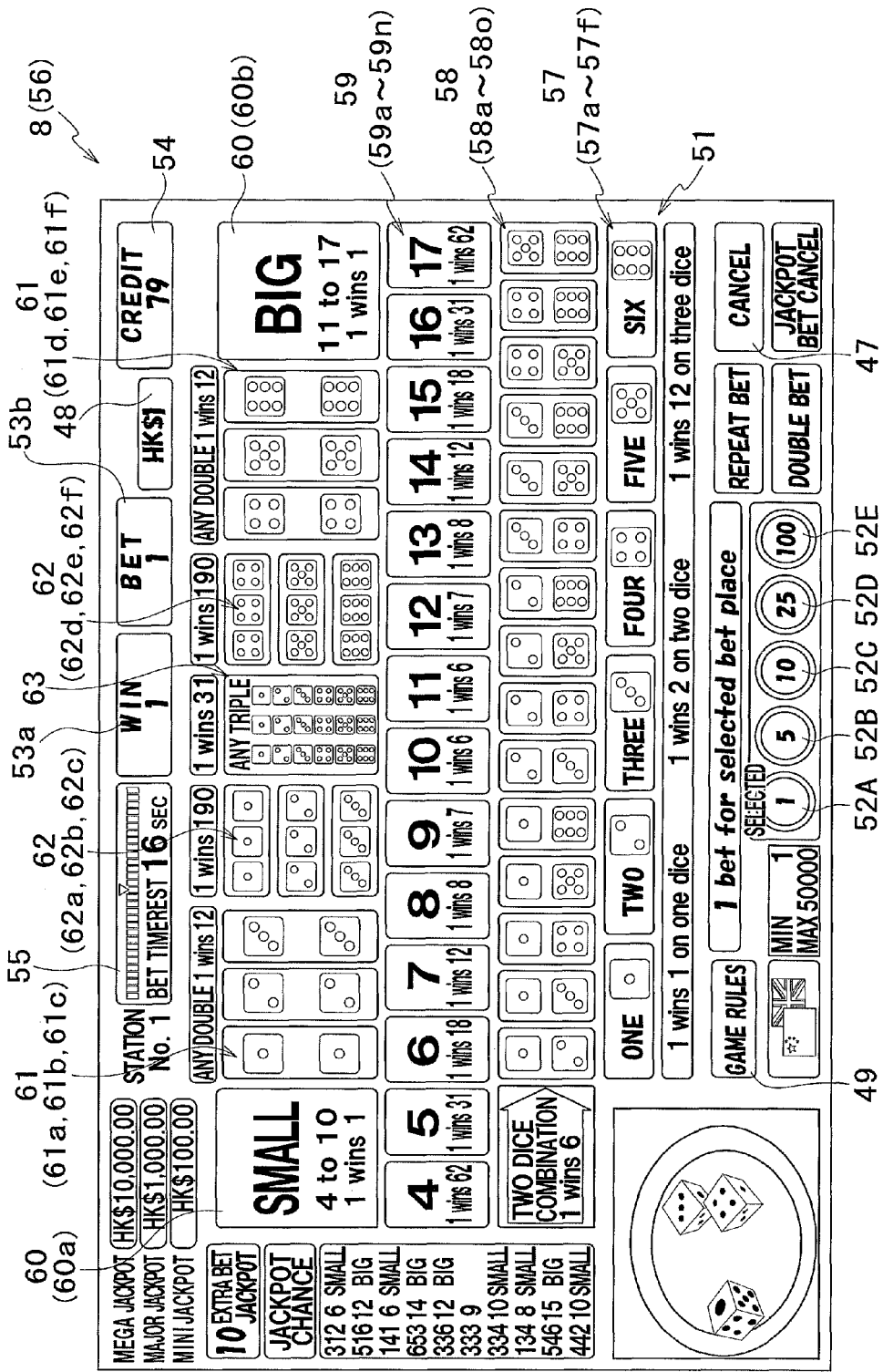
FIG. 6 illustrates a bet screen.

FIG. 4 is a block diagram schematically showing a control system of a gaming machine 1. As shown in FIG. 6, the gaming machine 1 includes a server 13 and several stations 4 (8 stations in this embodiment) associated with the server 13. The server 13 is associated with the Sic Bo unit 3 and the electric display unit 5. In the mean time, a control system of the station 4 will be specifically described later.

In addition, the server 13 includes a server control CPU 81 serving as a calculation and control device performing an entire control, a ROM 82 and a RAM 83, a timer 84 associated with the server control CPU 81, a liquid crystal display 32 associated with the CPU through a liquid crystal driving circuit 85, and a keyboard 33.

The server control CPU 81 executes a variety of processes, based on input signals supplied from the respective stations 4 and data or program stored in the ROM 82 and the RAM 83. Thereby, the server control CPU 81 transmits a command signal to the stations 4 based on execution results of the processes to initiatively control the respective stations 4, thereby progressing a game. Furthermore, the server control CPU 81 throws the three dices 27 by driving the throwing device of the Sic Bo unit 3. The server control CPU 81 then controls the win determining device 86 so as to determine the win number based on the state of the stopped dices 27. The server control CPU 81 determines which bet object is the winning bet object, based on the obtained win number and the bet information transmitted from each station 4. In addition, the server control CPU 81 calculates the credit-number to be paid out in each of the stations 4.

The ROM 82 includes a semiconductor memory, for example. The ROM 82 stores programs for implementing basic functions of the gaming machine 1 (e.g., a program for running a game and a program for executing a displayed number determining process), a payout odds table for determining payout odds (the number of credits to be paid out for each betted credit), a displayed number random determination table, a program for initiatively controlling each station 4, or the like.

The RAM 83 temporarily stores the bet information from the respective stations 4, a win number determined by the Sic Bo unit 3, data relating to a result of a process that is executed by the server control CPU 81, and the like.

Further, the server control CPU 81 is associated with a timer 84 that measures time. The time information of the timer 84 is transmitted to the server control CPU 81. The server control CPU 81 controls the throwing of the dices 27 based on the time information of the timer 84. Also based on the time information of the timer 84, the bet receiving times of the respective stations 4 are synchronized.

In addition, the server control CPU 81 is associated with the electric display unit 5. The server control CPU 81 controls light emission of a light emitting means such as LED to perform an effect by an electric spectacular and to display predetermined letters or time information of the timer 84 on the electric display unit 5.

In addition, the ROM 82 is provided with a memory area corresponding to payout odds relating to a Sic Bo game using the bet screen. The memory area stores data of a bet type or payout odds.

Furthermore, the RAM 83 is provided with a bet information memory area in which the bet information of a player who is currently playing a game is stored. The bet information memory area stores data of bet information or participation object in a form of a station management table. Further, the RAM 83 is provided with a win number memory area in which a win number of the Sic Bo unit 3 determined by the win determining device 86 is stored. In the mean time, the bet information is information about a bet that is made using the stations 4, such as the bet area displayed on the bet screen, the number of bet credits (bet-number) and bet type.

(Electrical Structure: Station 4)

Figure 5:
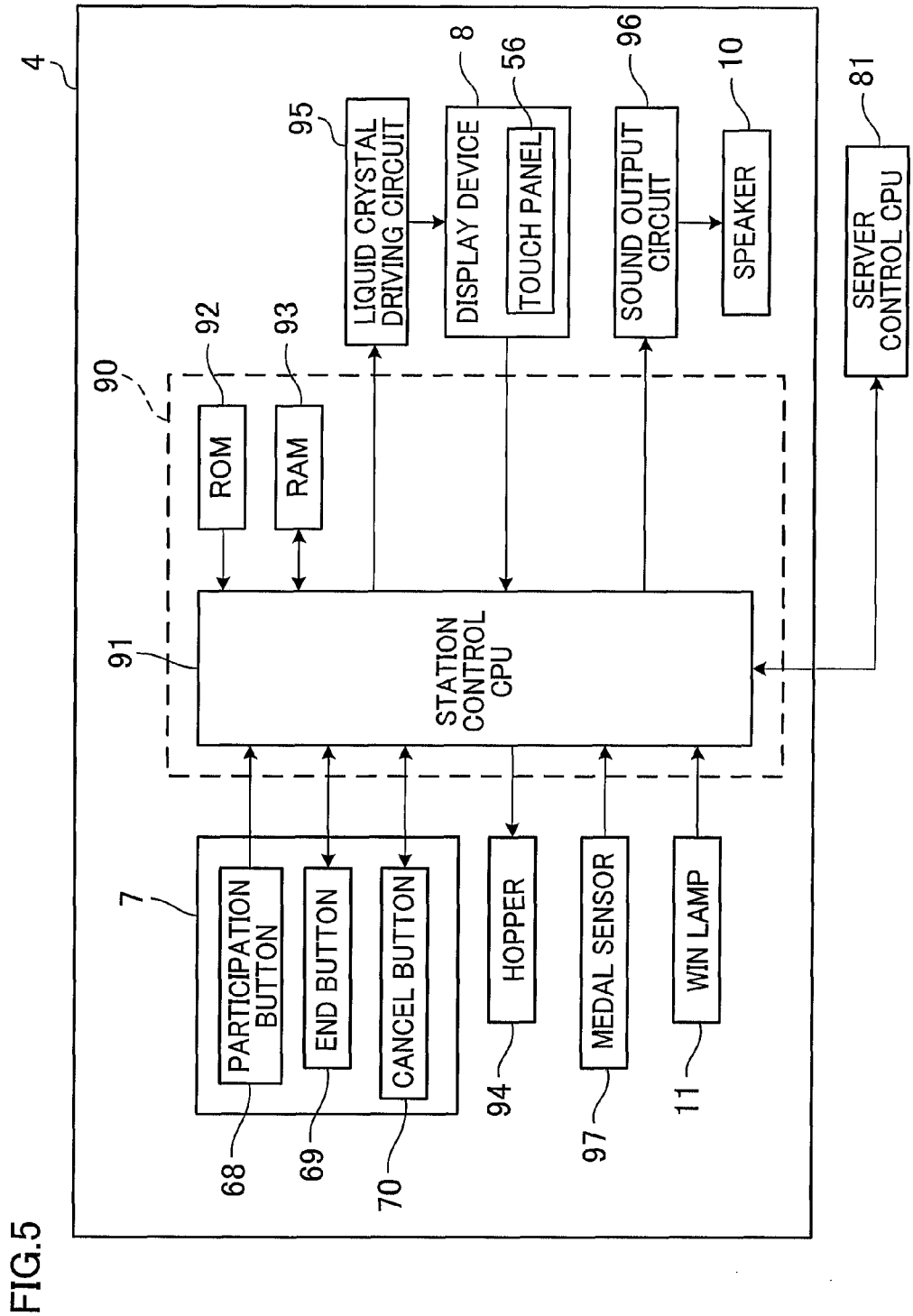
FIG. 5 is a block diagram schematically showing a control system of a station.

In the followings, a structure of a control system of the station 4 will be described. FIG. 5 is a block diagram showing a control system of the station 4 according to the embodiment. In the mean time, the eight stations 4 have a same structure, so that one station 4 will be described as an example.

The station 4 includes a station control unit 90 and several peripheral devices. The station control unit 90 includes a station control CPU 91, a ROM 92 and a RAM 93. The ROM 92 includes a semiconductor memory, for example. The ROM 92 stores a program for implementing basic functions of the station 4, various program s (for example, a program for executing a game execution process that is performed in the station) necessary for controlling the station 4, a data table and the like. In addition, the RAM 93 is a memory that temporarily stores various data calculated in the station control CPU 91, the number of credits that are currently possessed by a player (i.e., stored in the station 4), a bet situation of a player, and the like.

In addition, the station control CPU 91 is associated with the participation button 68, the end button 69, and the cancel button 70, which are equipped in the control unit 7. Based on operation signals outputted as the respective buttons are pressed, the station control CPU 91 performs a control so as to execute the corresponding operations. To be more specific, based on an input signal that is inputted from the control unit 7 as an operation of a player is received and the data or program stored in the ROM 92 and the RAM 93, the station control CPU executes a variety of processes and transmits the results thereof to the server control CPU 81. In the mean time, the station control CPU 91 receives a command signal from the server control CPU 81, controls the peripheral devices constituting the station 4 and progresses a game in the station 4. In addition, the station control CPU 91 executes a variety of processes, based on an input signal that is inputted from the control unit 7 as an operation of a player is received and the data or program stored in the ROM 92 and the RAM 93, depending on contents of process, controls the peripheral devices constituting the station 4 based on the process results and progresses a game in the station 4.

In addition, the station control CPU 91 is associated with a hopper 94. The hopper 94 pays out the predetermined number of medals from the medal payout slot 9 in accordance with a command signal from the station control CPU 91. Furthermore, the station control CPU 91 is connected with an display device 8 through a liquid crystal driving circuit 95. The liquid crystal driving circuit 95 includes a program ROM, an image ROM, an image control CPU, a work RAM, a VDP (video display processor), a video RAM and the like. The program ROM stores an image control program for display on the display device 8, a variety of selection tables and the like.

In addition, the image ROM stores dot data for forming an image to be displayed on the display device 8, for example. The image control CPU determines an image to be displayed on the display device 8 from the dot data previously stored in the image ROM, in accordance with an image control program previously stored in the program ROM, based on parameters set in the station control CPU 91. In addition, the work RAM includes a temporary memory means used when the image control program is executed in the image control CPU. In addition, the VDP forms an image relating to contents of display determined in the image control CPU and outputs the image on the display device 8. In the mean time, the video RAM is structured as a temporary memory means used when an image is formed in the VDP.

In addition, a touch panel 56 is attached on a front of the display device 8. Operation information of the touch panel 56 is transmitted to the station control CPU 91. The touch panel 56 detects a touch input to the bet screen made by a player and outputs the positional information thereof to the station control CPU 91. Based on the information, the current bet information of a player (a bet area indicated on the bet screen and the number of credits bet) is stored in the RAM 93 at all times. Furthermore, the bet information is transmitted to the server control CPU 81 and is stored in the bet information memory area of the RAM 83.

Furthermore, a sound output circuit 96 and a speaker 10 are connected to the station control CPU 91. The speaker 10 generates a variety of effect sounds when performing various effects, based on an output signal from the sound output circuit 96.

In addition, a medal sensor 97 is associated with the station control CPU 91. The medal sensor 97 detects medals inserted from the medal insertion slot 6, calculates the inserted medals, and transmits a result thereof to the station control CPU 91. The station control CPU 91 increases the credit-number possessed by a player, which is stored in the RAM 93, based on the transmitted signal. Furthermore, the station control CPU enables the credit-number indicator 54 on the bet screen to display a credit-number.

In addition, a win lamp 11 is associated with the station control CPU 91. When the bet object bet on the bet screen wins, the station control CPU 91 turns on the win lamp 11 in a predetermined color.

(Bet Screen of Display Device 8)

First, the bet screen that is displayed on the display device 8 will be described with reference to FIG. 6. In the table-type betting board 51 that displays a variety of bet areas 57 to 63 to be displayed on the bet screen, designs of dices showing "1" to "6" corresponding to the pips of three dices, a combination of the designs of the dices, a summed number of the pips of the dices are arranged. The bet areas 57 to 63 correspond to the bet object display area 110a.

Above the bet screen, a bet timer count 55, a payout result display sections 53 (53a and 53b), a unit game charge display section 48, and a credit-number indicator 54.

The bet timer count 55 displays a remaining time for which a player can make a bet. After a bet time is started, a number of the count is gradually decreased. When the number becomes "0", a time for which a bet can be made in a current game is over. The betting is confirmed at the end of the bet receiving time and received. When the number displayed by the bet timer count 55 reaches a specific number (10 in the present embodiment), the throwing device 87 of the Sic Bo unit 3 starts to throw the dices 27.

The payout result display section 53b displays the number of chips betted on the previous game by the player, and the payout result display section 53a displays the number of credits to be paid out.

The unit game charge display section 48 displays a charge equivalent to a single credit. In the case of FIG. 6, a single credit is equivalent to one Hong Kong dollar. This indicates that the number of credits is increased by one when one Hong Kong dollar is inserted.

Furthermore, the credit-number indicator 54 displays the number of credits possessed by a current player (i.e., inserted into the gaming machine 1 by the player). When a chip is bet, the credit-number is decreased in proportional to the bet-number (one credit for one bet). In addition, when a win is determined for the chip bet and the payout of credits is performed, the credit-number is increased as the payout-number. In the mean time, when the credit-number possessed by a player is 0, the game is over.

Below the bet screen are displayed unit bet buttons 52 (1 bet button 52A, 5 bet button 52B, 10 bet button 52C, 25 bet button 52D, and 50 bet button 52E) corresponding to the bet amount display area 110b, a bet cancellation button 47, and a game rule button 49.

The unit bet buttons 52 are provided for a player to select the number of credits to be bet on bet areas 57 to 63 (above the designs of the dices, a combination of the designs of the dices, and a summed number of the pips of the dices) in the table-type betting board 51, indicated by the player. The unit bet buttons 52 include a 1 bet button 52A, a 5 bet button 52B, a 10 bet button 52C, a 25 bet button 52D, and a 50 bet button 52E. First of all, the player makes a touch input onto the unit bet button 52 so as to determine a charge required when selecting a bet object.

The bet cancellation button 47 is provided for canceling the betting on any of the bet areas 57 to 63 in the table-type betting board 51, which have been specified by the player. As a touch input is made on the bet cancellation button 47, the cancel mode is set and a bet object selected in this mode is canceled. The cancel mode is dismissed when a touch input is made on the bet cancellation button 47 again or a touch input is made on the unit bet button 52.

The game rule button 49 is pressed when, for example, it is unclear how to play the game. When the game rule button 49 is pressed, a game rule screen displaying various types of operation information is immediately displayed on the display device 8.

(Bet Type and Payout Odds Corresponding to Bet Type)

In the followings, the bet type and the payout odds corresponding to the bet type will be described with reference to FIGS. 6 and 7. In Sic Bo of the present embodiment, combinations of win numbers resulting from the throwing of the three dices 27 in the Sic Bo unit 3 are the bet objects. The following will specifically describe the types of bet objects and the payout odds thereof.

Described first is "Numbers Bet (Numbers-Single, Numbers-Double, and Numbers-Triple)" wherein a bet is made on one of the numbers 1 to 6. The "Numbers Bet" corresponds to the bet areas 57 in the game screen (FIG. 6), and the numbers 1 to 6 correspond to the bet areas 57a to 57f, respectively. As shown in FIG. 7, the payout odds is changed depending on how many the win numbers bet conform to the three win numbers. When one of the three win numbers conforms to, the payout odds is 1:1. When two of the three win numbers conform to, the payout odds is 2:1. When all three conform to, the payout odds is 12:1. For example, for a case where a bet is made on the number 4, when only one of the three win numbers is 4 (Numbers-Single), the credit bet on the number of 4 is paid out in a ratio of 1:1. In addition, when two of the three win numbers are 4 (Numbers-Double), the credit bet on the number 4 is paid out in a ratio of 2:1. In addition, when all the three win numbers are 4 (Numbers-Triple), the credit bet on the number 4 is paid out in a ratio of 12:1.

Now, "Pair Match" wherein a bet is made on a combination of two different numbers among the numbers 1 to 6 will be described. The "Pair Match" corresponds to the bet areas 58 in the game screen (FIG. 6). More specifically, the combinations "1, 2", "1, 3", "1, 4", "1, 5", "1, 6", "2, 3", "2, 4", "2, 5", "2, 6", "3, 4", "3, 5", "3, 6", "4, 5", "4, 6", and "5, 6" correspond to the bet areas 58a to 58o, respectively. As shown in FIG. 7, the payout odds in "Pair Match" is 6:1. For example, provided that a bet is made on the "Pair Match" of "3, 5", winning is achieved when at least two of the three dices 27 show 5 and 3 after the dices are thrown. When the win numbers become 4, 3 and 5, five times of the chips bet are paid out. For the "Pair Match", a victory prize is paid out only for one combination. In other words, when the win numbers become 3, 5 and 5, a victory prize is paid out for one combination. To the contrary, for a case where a bet is made on two or more "Pair Match" and winning is achieved in a plurality of combinations, a victory prize is paid out for each of the combinations.

Now, "Specific Total" in which a bet is made on the total of the three win numbers will be described. The "Specific Total" corresponds to the bet area 59 in game screen (FIG. 6). More specifically, the numbers "4", "5", "6", "7", "8", "9", "10", "11", "12", "13", "14", "15", "16", and "17" correspond to the bet areas 59a to 59n, respectively. As shown in FIG. 7, the payout odds in the "Specific Total" are "62:1", "31:1", "18:1", "12:1", "8:1", "7:1", "6:1", "6:1", "7:1", "8:1", "12:1", "18:1", "31:1", and "62:1" for the respective numbers above.

Now, the following will describe "Any Double" wherein a bet is made on the case where selected one of the numbers 1 to 6 is identical with at least two of the three win numbers. The "Any Double" corresponds to the bet areas 61 in the game screen (FIG. 6), and the numbers 1 to 6 correspond to the bet areas 61a to 61f, respectively. As shown in FIG. 7, the payout odds is 12:1. Note that, even if the number on which a bet has been made as the "Any Double" is identical with all of the three win numbers, such a case is also recognized as winning in the "Any Double".

Now, "Specific Triple" wherein a bet is made on the case where all three win numbers are a number selected from the numbers 1 to 6 will be described. The "Specific Triple" corresponds to the bet areas 62 in the game screen (FIG. 6), and the numbers 1 to 6 correspond to the bet areas 62a to 62f, respectively. In this bet type, the payout odds is 190:1, which is a high payout, as shown in FIG. 7.

Described next is "Any Triple" wherein a bet is made on the case where all three win numbers are the same. The "Any Triple" corresponds to the bet area 63 in the game screen (FIG. 6). In this bet type, the payout odds is 31:1, as shown in FIG. 7.

The following will describe "Small Bet" (bet area 60a) and "Big Bet" (bet area 60b) wherein a bet is made on a range of the sum of the three win numbers. In this bet type, the payout odds is always 1:1, as shown in FIG. 7. In the "Big Bet", a bet is made on a sum 11 to 17 of the win numbers, and in the "Small Bet", a bet is made on a sum 4 to 10 of the win numbers. When a combination of the win numbers is "Any Triple" (i.e., when the total sum of the three win numbers is 6, 9, 12, or 15) for a bet of "Big Bet" or "Small Bet", a defeat is made without a payout.

(Bet Operation)

Figure 8:
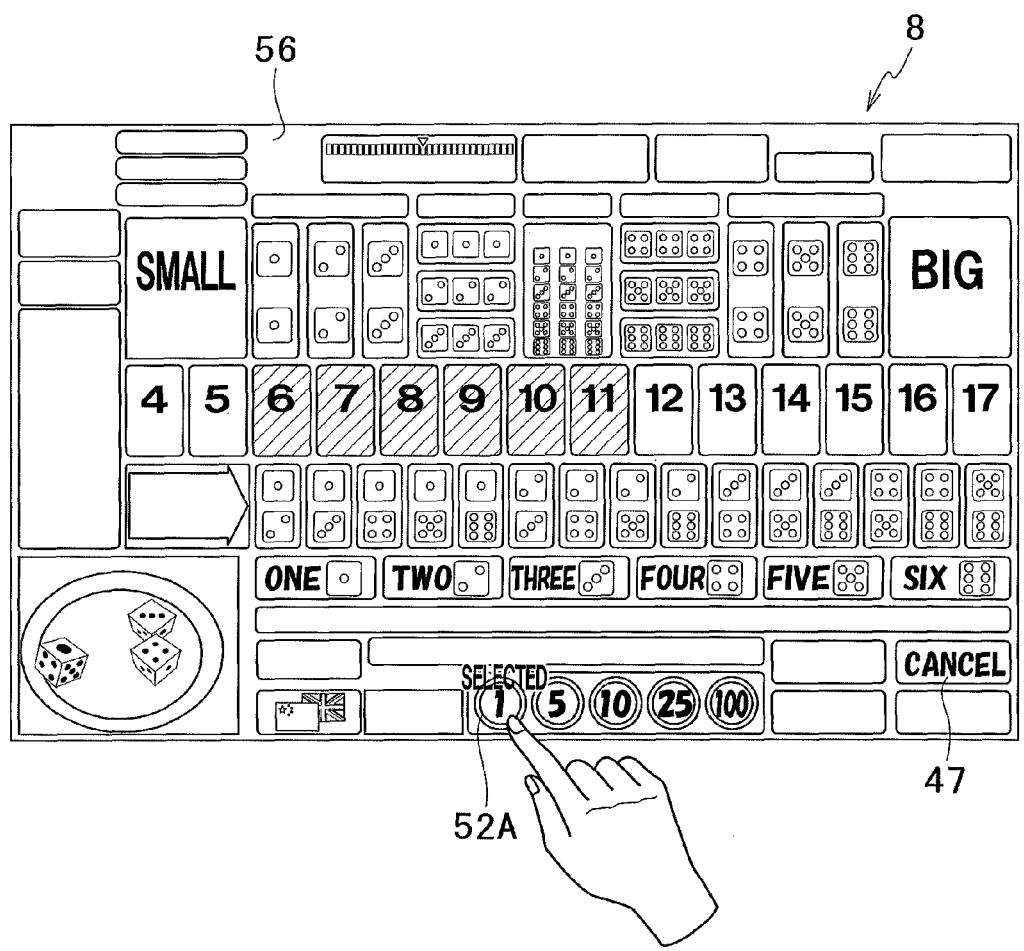
FIG. 8 illustrates an example of a bet operation in the gaming machine.

The following will describe a bet operation of making a bet on a bet object displayed in the display device 8 as described above, during the bet receiving time. First, the player makes a touch input on one of the unit bet buttons 52 (1 bet button 52A, 5 bet button 52B, 10 bet button 52C, 25 bet button 52D, and 50 bet button 52E) so as to determine the bet amount (credit-number) to be bet on a bet object. For example, in FIG. 8, a touch input is made on the 1 bet button 52A and hence the bet amount is one credit. As shown in FIG. 8, the text "SELECTED" is displayed on the upper part of the selected 1 bet button 52A, in order to indicate that one credit has been selected as the bet amount. The selected bet amount is not necessarily indicated in this way. The indication may be done by color change or a change in the display state of the 1 bet button 52A, for example. Alternatively, a specific unit bet button 52 (corresponding to a small bet amount, e.g., 1 bet button 52A) may be selected by default.

Subsequently, the player makes a touch input on a bet object to make a bet on a desired bet object. As shown in FIG.

Figure 9:
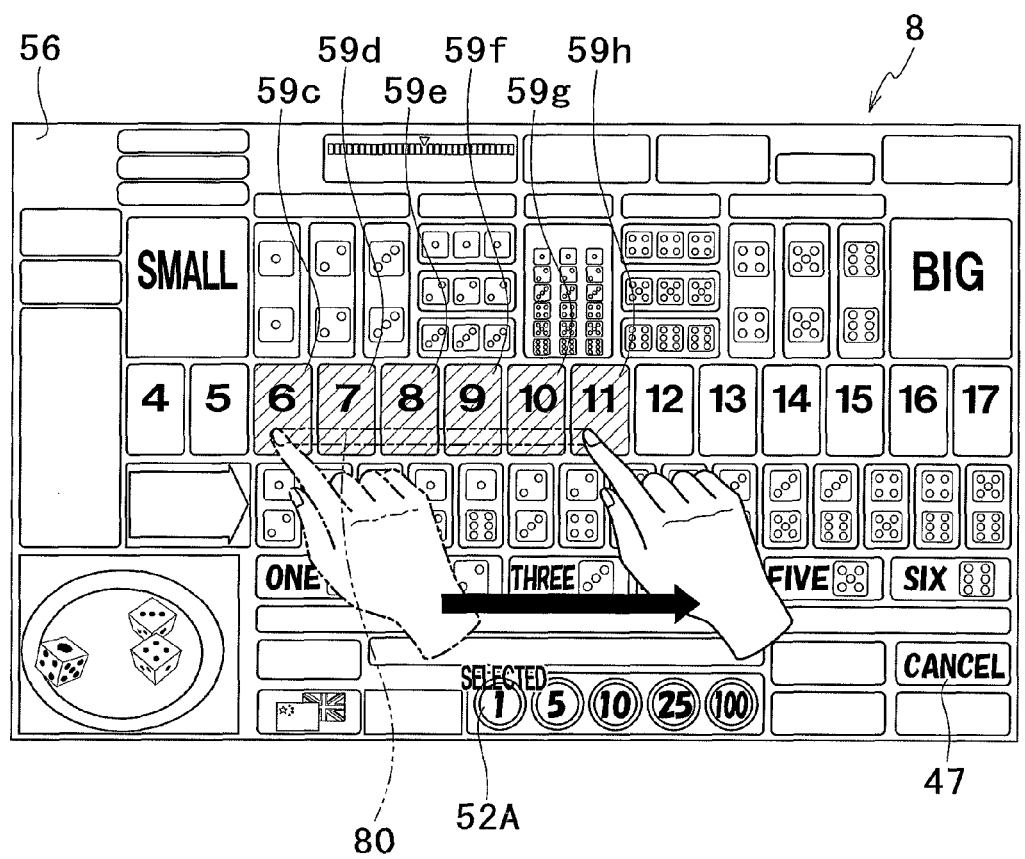
FIG. 9 illustrates an example of a bet operation in the gaming machine.

9, the player is allowed to make betting on a plurality of bet objects by means of a sliding operation. In the case of FIG. 9, a sliding operation is carried out across the bet areas 59c to 59h. In other words, the sliding operation is carried out such that the moving path 80 of the touched position is formed across the bet areas 59c to 59h. As a result, betting on the bet areas 59c to 59h with the selected bet amount is received. The betting is fixed at the end of the bet receiving time, and is output as bet information to the center controller 102. While the present embodiment is arranged so that the colors of the selected bet objects are changed as shown in FIG. 9, the disclosed technology is not limited to this arrangement.

Figure 10:
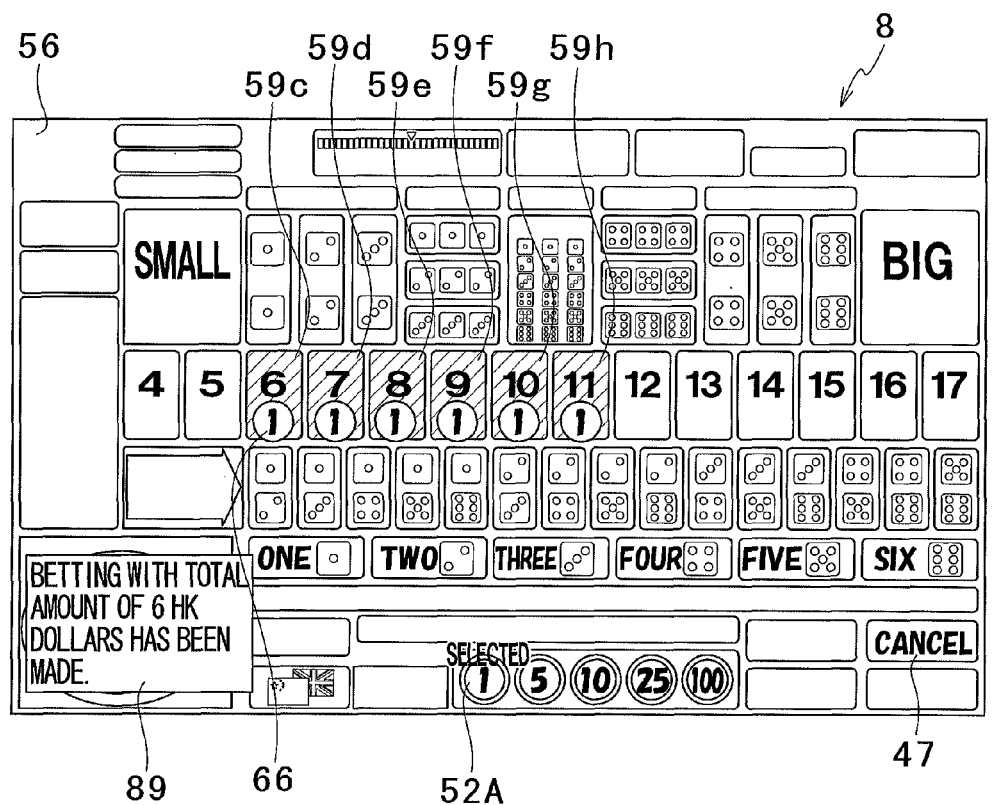
FIG. 10 illustrates an example of a bet operation in the gaming machine.

As shown in FIG. 10, when the touch input above is performed and then betting on a plurality of bet objects is conducted at once by at least a sliding operation, a total bet amount display section 89 is displayed to indicate the total of the bet amounts of the betting made by the sliding operation. The summed number may be the total credit number, or a value calculated by multiplying the total credit number by a unit game charge as in the present embodiment.

On each bet object on which betting has been made, a credit mark 66 is displayed. The credit mark 66 shows the number indicating the bet amount, to allow the player to recognize the bet amount bet on the bet object. For example, in the case of FIG. 10, credit marks 66 indicating the number 1 are displayed on all of the bet areas 59c to 59h, thereby making it possible to recognize that betting with one credit has been made on each the bet objects in the bet areas 59c to 59h. Although not illustrated, when, for example, the 5 bet button 52B is selected from the unit bet buttons 52 and betting is made therewith, a credit mark 66 indicating the number 5 is displayed on a bet object.

It is possible to conduct further betting by repeating the operation above. For example, when betting is made on an object on which betting has already been made, the number indicated by the credit mark 66 is increased.

(Cancellation Operation)

Figure 11:
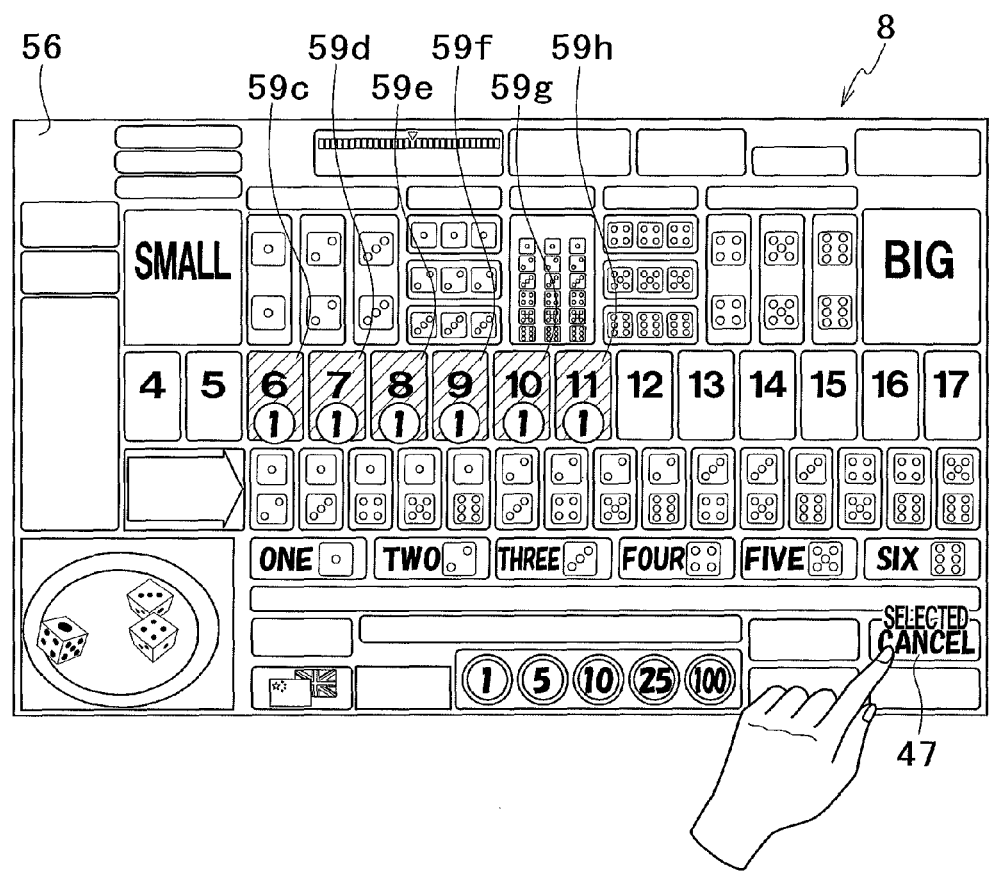
FIG. 11 shows an example of a bet cancellation operation in the gaming machine.

Now, a cancellation operation to cancel betting made during the bet receiving time will be described. First, as shown in FIG. 11, the player makes a touch input on the bet cancellation button 47 so that the bet receiving state shifts to a cancel mode. In response to this, the text "SELECTED" is displayed on the upper part of the cancellation button 47 to indicate that the cancel mode has been set. The indication may be done in a different way, e.g., color change or a change in the display state of the cancellation button. Note that, along with the shift to the cancel mode, the text "SELECTED" displayed on one of the unit bet buttons 52 is changed to non-display.

Figure 12:
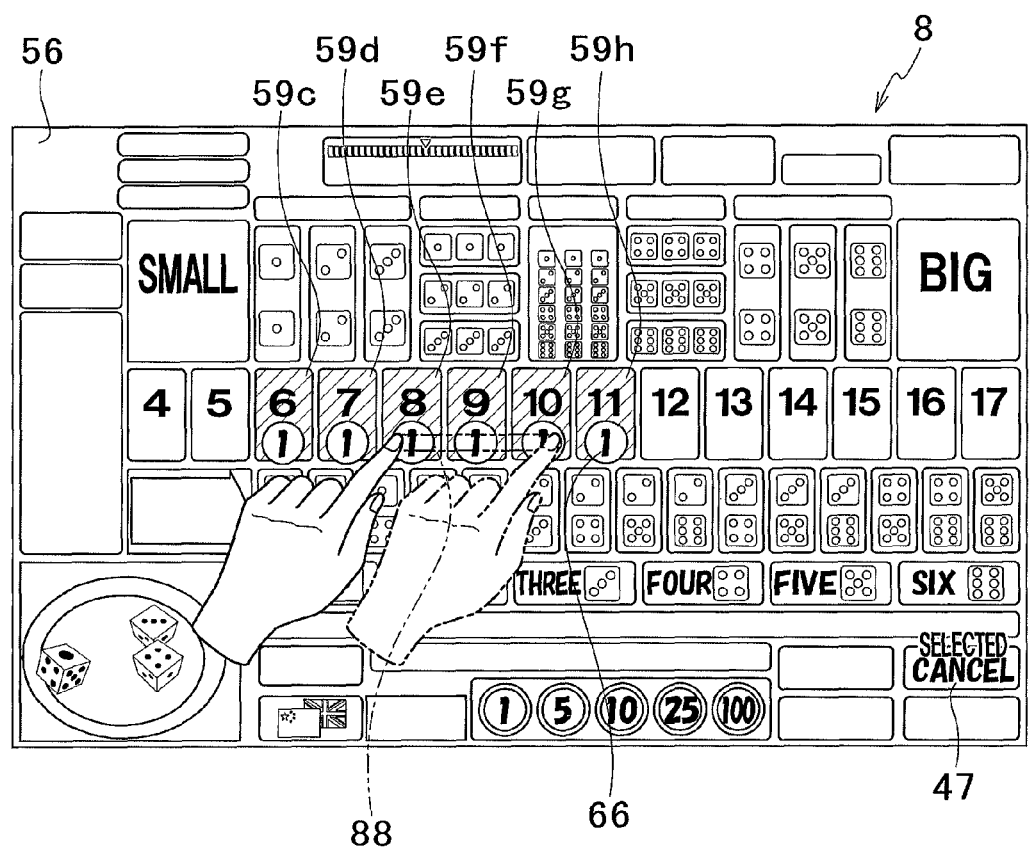
FIG. 12 shows an example of a bet cancellation operation in the gaming machine.

Thereafter, the player makes a touch input on a desired bet object in the cancel mode to cancel the betting on the bet object. As shown in FIG. 12, the player is allowed to cancel the betting on a plurality of bet objects by means of a sliding operation. For example, in the case of FIG. 12, a sliding operation is carried out across the bet areas 59e to 59g. In other words, a sliding operation is carried out so that the moving path 88 of the touched position is formed across the bet areas 59e to 59g. With this, the betting on the bet areas 59e to 59g is canceled.

Figure 13:
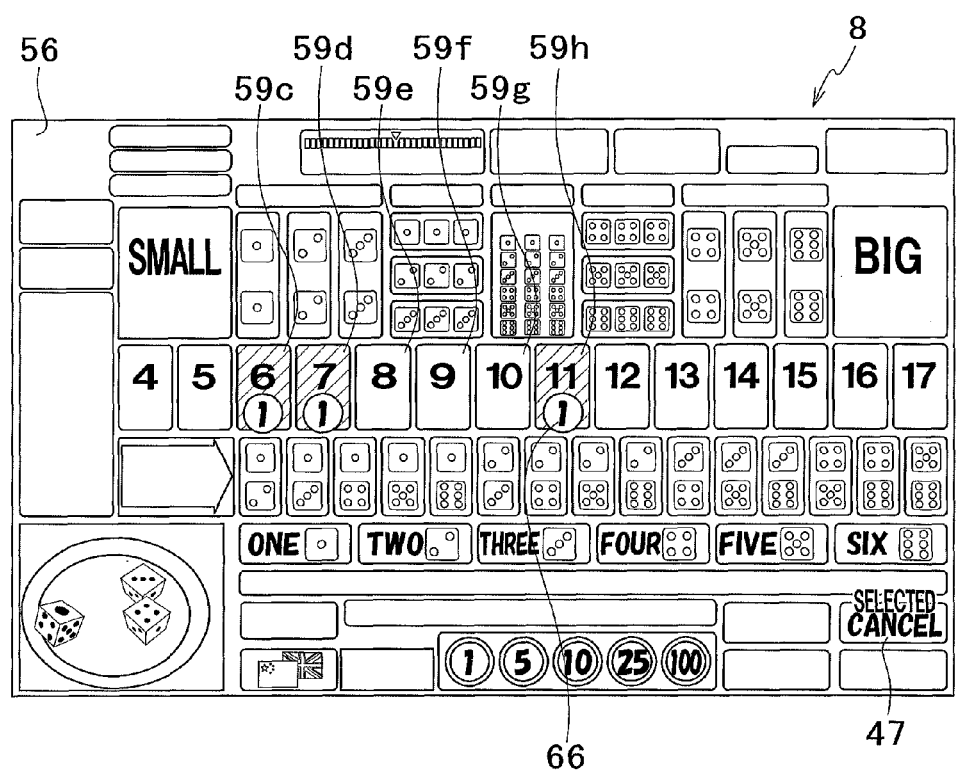
FIG. 13 shows an example of a bet cancellation operation in the gaming machine.

In the bet objects where the touch input above is made and then the betting is canceled, as shown in FIG. 13, all credits having been bet are canceled and the credit marks 66 are changed to non-display.

(Process Operations)

Figure 14:
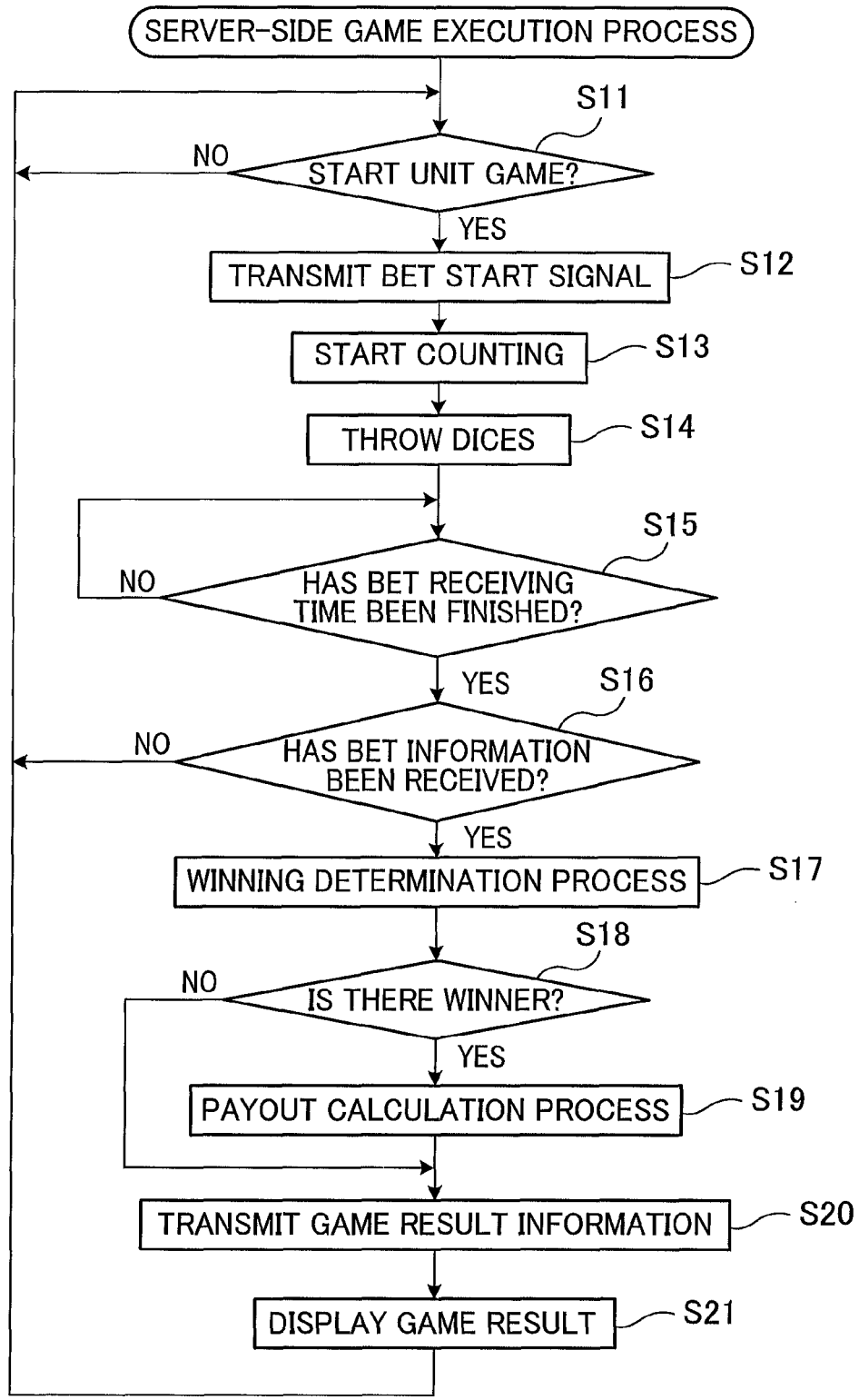
FIG. 14 is a flowchart of a server-side game execution process program.
Figure 15:
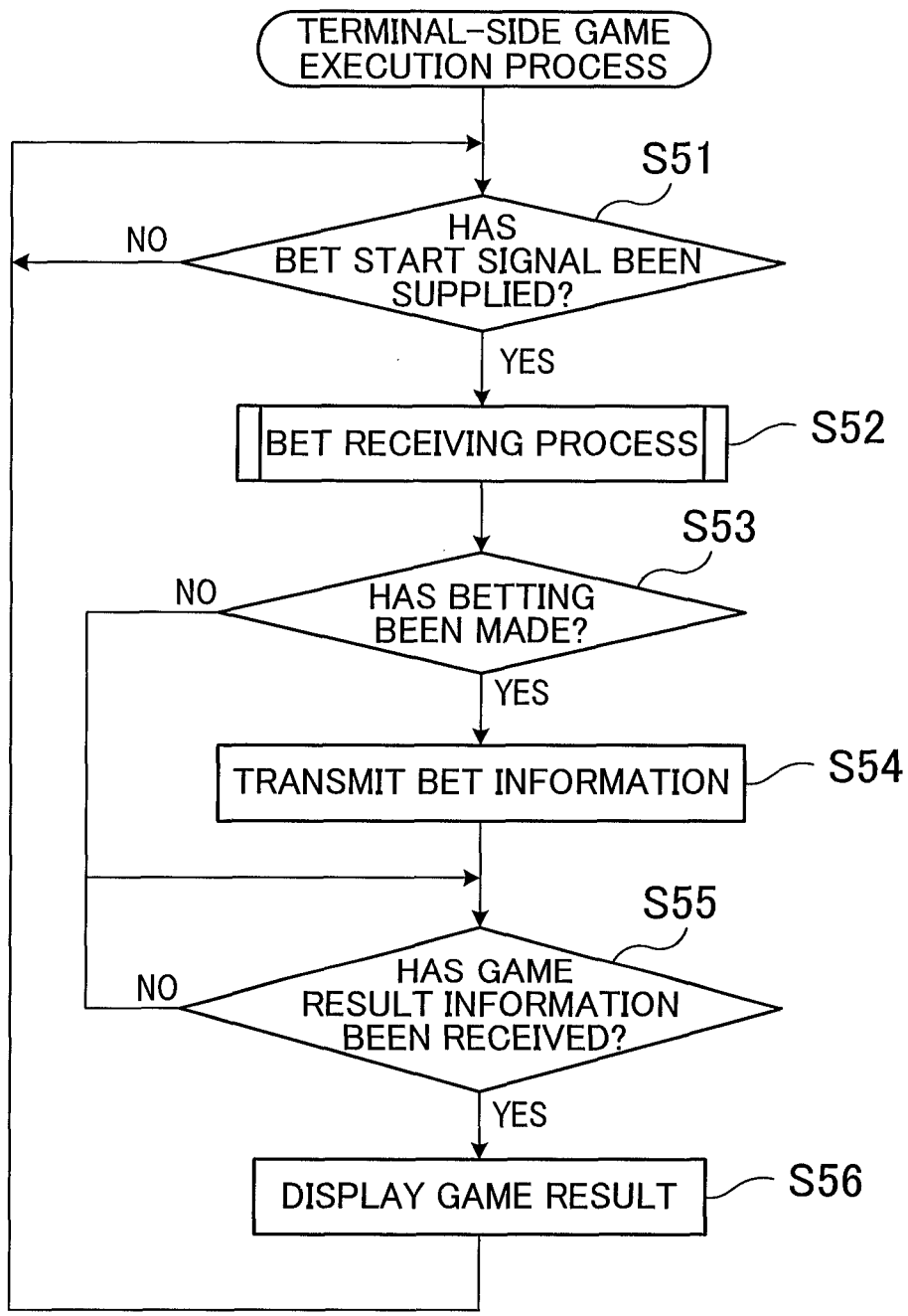
FIG. 15 is a flowchart of a terminal-side game execution process program.
Figure 16:
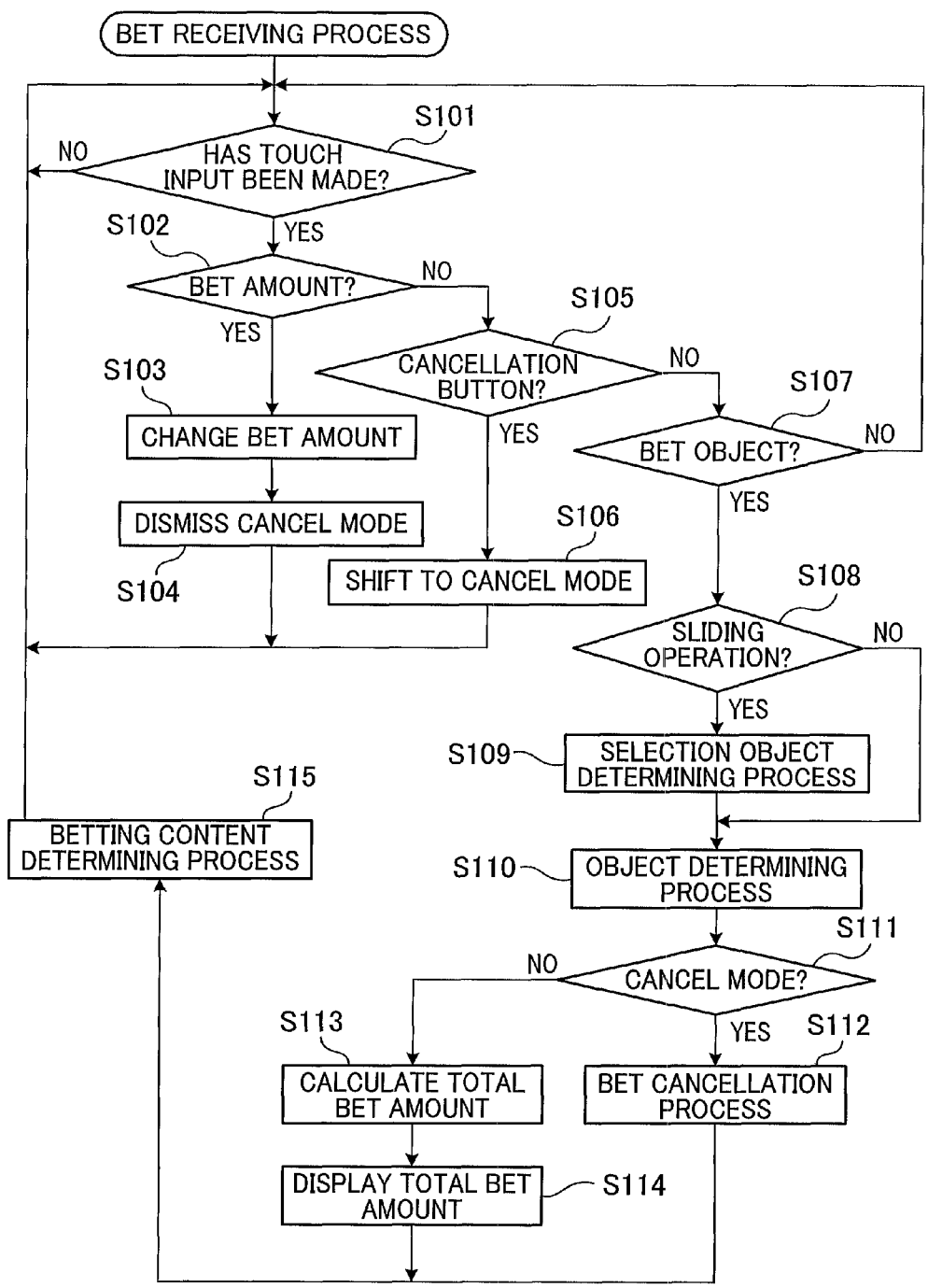
FIG. 16 is a flowchart of a bet receiving process program.

In the followings, an operation will be described, based on a game execution process program that is performed in the server by the server control CPU 81 and a game execution process program that is performed in the station 4 by the station control CPU 91, in the gaming machine 1. In the mean time, each program shown in flow charts of FIGS. 14, 15, and 16 is stored in the ROM 82 or RAM 83 provided to the server 13, or the ROM 92 or RAM 83 provided to the station 4, and is executed by the server control CPU 81 or station control CPU 91.

(Operation of Server-Side Control System: Server-Side Game Execution Process)

The server-side game execution process executed by the gaming machine 1 will be described with reference to FIG. 14. FIG. 14 is a flowchart of the server-side game execution process program in the gaming machine 1.

First, whether to start a unit game is determined (S11). More specifically, based on the counting by the timer 84 of the server 13, the unit game is run at a predetermined interval. Whether to start the unit game is determined based on whether the predetermined interval elapses. When the unit game is not started (S11: NO), the process is on standby until the predetermined interval elapses.

On the other hand, if the unit game is started (S11: YES), a bet start signal is transmitted to each station 4 (S12). Thereafter, after the counting of a predetermined time (bet receiving time) is started (S13), the throwing device 87 is driven after a predetermined time elapses, so that the three dices 27 are thrown (S14). Then whether the bet receiving time has been finished is determined (S15). Whether the bet receiving time has been finished is determined based on the counting of the predetermined time. When the bet receiving time has not been finished (S15: NO), the process is on standby until the counting of the bet receiving time finishes.

On the other hand, when the bet receiving time has finished (S15: YES), whether bet information has been received from each station 4 is determined (S16). When no bet information is received from any station 4 (S16: NO), the start of the next unit game is waited for. On the other hand, when bet information is received from any station 4 (S16: YES), a winning determination process is executed (S17). In the winning determination process, winning is determined such that three win numbers determined by the Sic Bo unit 3 are obtained and these win numbers are compared with the bet information from each station 4.

When there is a winner (S18: YES), a payout calculation process is carried out (S19) and game result information is transmitted to each station (S20). Thereafter, the game result is displayed on the information displays 15 of the electric display unit 5 or the like (S21), and the start of the next unit game is waited for.

(Operation 1 of Terminal-Side Control System: Terminal-Side Game Execution Process)

A terminal-side game execution process that is performed in the station 4 will be described with reference to FIG. 15. FIG. 15 is a flow chart of a terminal-side game execution process program. The program shown in the flow chart is stored in the ROM 92 or RAM 93 provided to the station 4 and is executed by the station control CPU 91.

First of all, the station control CPU 91 determines whether a bet start signal has been supplied from the server 13 (S51). After executing a bet receiving process (S52) which will be described later with reference to FIG. 16, whether betting has been made in the station 4 is determined (S53). If no betting has been made (S54), game result information is waited for.

If betting has been made (S53: YES), the bet information based on the betting is supplied to the server 13 (S54), and then whether game result information has been received is determined (S55). If the game result information has not been received (S55: NO), the process is on standby. On the other hand, if the game result information has been received (S55:

YES), the game result is displayed on the display device 8 (S56), and the next bet start signal is waited for. Note that, when awarding of a payout is needed in S56, the awarding of the payout or the like is carried out.

(Operation 2 of Station-Side Control System: Bet Receiving Process)

The bet receiving process in the station 4 will be described with reference to FIG. 16. FIG. 16 is a flowchart of a program run in the bet receiving process. The program described in the flowchart is stored in the ROM 92 or the RAM 93 of the station 4, and is executed by the station control CPU 91.

The routine is finished by the interruption at the end of the bet receiving time. However, when a touch input is received before the end of the bet receiving time, the routine is finished after the completion of the betting content determining process of the step S115 even if the interruption at the end of the bet receiving time is made.

First, the station control CPU 91 determines whether a touch input has been made on the touch panel 56 (S101). If there is no touch input (S101: NO), a touch input is waited for.

On the other hand, if there is a touch input (S101: YES), on which area the touch input is made is determined based on the information regarding the touched position transmitted from the touch panel 56. More specifically, first of all, whether the touched position locates in the bet amount display area 110b, i.e., one of the unit bet buttons 52 is determined (S102). If the touched position locates at a unit bet button 52, a process of changing the bet amount is executed (S103). More specifically, information concerning the selected unit bet button 52 is temporarily stored in the RAM 93, and identification display such as the texts "SELECTED" is displayed on the selected unit bet button 52 as shown in FIG. 8. Thereafter, when the cancel mode has been set, i.e., when the RAM 93 stores information indicating that the cancel mode has been set, the information is updated to dismiss the cancel mode (S104), and then a touch input is waited for again in the step S101.

In the meanwhile, if it is determined in the step S102 that the touched position does not locate in the bet amount display area 110b (S102: NO), whether the touched position locates in the cancellation operation area 110c, i.e., in the cancellation button 47 is determined (S105). When the touched position locates in the cancellation operation area 110c, information indicating that the cancel mode has been set is stored in the RAM 93 so that the cancel mode is set, and a touch input is waited for again in the step S101.

On the other hand, if it is determined in the step S105 that the touched position does not locate in the cancellation operation area 110c (S105: NO), whether the touched position locates in the bet object display area 110a, i.e., in the bet areas 57 to 63 is determined (S107). If the touched position does not locate in the bet object display area 110a (S107: NO), a touch input is waited for again in the step S101.

On the other hand, if the touched position locates in the bet object display area 110a (S107: YES), whether a sliding operation is carried out in the bet object display area 110a is determined (S108). If the sliding operation is carried out (S108: YES), a selection object determining process is carried out (S109). More specifically, based on the moving path information of the touched position transmitted from the touch panel 56, which bet areas 57 to 63 on the moving path is the selection object is determined. Thereafter, in an object determining process (S110), information regarding the selection object is stored in a predetermined region of the RAM 93, so that the selection object is fixed.

Thereafter, whether the cancel mode has been set is determined (S111). That is to say, whether the RAM 93 stores information indicating that the cancel mode has been set is determined. When the cancel mode has been set (S111: YES), a bet cancellation process is carried out for the selection object (S112). More specifically, a bet object which is the target of cancellation is temporarily stored in the RAM 93.

On the other hand, if the cancel mode has not been set (S111: NO), a total bet amount is calculated by multiplying the number of selection objects by a unit game charge (S113), and the total bet amount is displayed (S114).

After the bet cancellation process in the step S112 or after the total bet amount display process in the step S114, a betting content determining process is executed (S115). More specifically, when the cancel mode is not set, the betting with the bet amount temporarily stored in the RAM 93 is received for all selection objects determined in S110, processes such as displaying the credit mark 66 on the display device 8 are carried out, and bet information is generated based on the received betting. If the cancel mode has been set, the content of the betting made on the selection object, which is temporarily stored in the RAM 93, is deleted. As such, the content of the betting is fixed. In addition to the above, processes such as changing the displayed credit mark 66 to non-display are carried out. Then a touch input is waited for again in the step S101.

While the present invention has been described in conjunction with the embodiment outlined above, it is evident that many alternatives, modifications and variations will be apparent to those skilled in the art. Accordingly, the effects of embodiment of the invention as set forth above are merely listed as most favorable effects of the invention, and hence the effects of the invention are not limited to those in the embodiment.

For example, the sliding operation is not necessarily carried out in the manner described in the present embodiment. For example, as the credit mark 66 on the bet object on which the betting has already been made is touched and slid onto another bet object, the credit indicated by the touched and slid credit mark 66 is also bet on that bet object.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The above descriptions include a process that is executed on a computer. The above descriptions and expressions have been provided so that the one skilled in the art can understand the invention most effectively. In the specification, the respective steps used to induce one result or blocks having a predetermined processing function should be understood as a process having no self-contradiction. In addition, the electrical or magnetic signal is transmitted/received and written in the respective steps or blocks. Although the processes in the respective steps or blocks embody the signal as a bit, value, symbol character, term, number and the like, it should be noted that these have been used for the convenience of descriptions. Further, although the processes in the respective steps or blocks have been often described as an expression common to a human action, the process described in the specification is executed by a variety of devices in principle. In addition, the other structures necessary for the respective steps or blocks are apparent from the above descriptions.

What is claimed is:

1. A gaming machine comprising:
   a display device which has a bet object display area where a plurality of bet objects are displayed and further has a bet amount display area where a plurality of bet amounts are displayed;
   a touch panel which is provided on the front surface side of the display device to be able to receive a touch input and detect a touched position of the touch input; and
   a controller which is programmed to execute the processes of:
   (a1) determining a bet amount based on a touched position of a first touch when it is determined that the touched position of the first touch corresponds to one of the bet amounts in the bet amount display area;
   (a2) determining a first set of bet objects which are on a single moving path of a second touch among the plurality of bet objects in the bet object display area when it is determined that the second touch drags the first set of bet objects without being removed from the touch panel to form the single moving path; and
   (a2-1) applying the bet amount determined in the process (a1) to each bet object in the first set of bet objects determined in the process (a2),
   wherein a number of bet objects in the first set of bet objects increases as a length of the single moving path increases,
   a first image showing the determined bet amount is displayed in the bet amount display area when the bet amount is determined based on the touched position of the first touch, and
   color of each of the first set of bet objects is changed and a second image showing the determined bet object being betted to each of the first set of bet objects is displayed in the bet object display area when the first set of bet objects are determined based on the second touch.

2. The gaming machine according to claim 1, wherein, the display device further includes a cancellation operation area, and
   the controller further executes the processes of:
   (a3) determining whether a touched position of a third touch is positioned in the cancellation operation area; and
   (a4) receiving cancellation of the betting on each of a second set of bet objects which are on a single moving path of a fourth touch among the plurality of bet objects in the bet object display area when the fourth touch drags the second set of bet objects in the bet object display area after it is determined that the touched position of the third touch is positioned in the cancellation operation area.

3. The gaming machine according to claim 2, wherein, the controller executes the process of: (a5) displaying, on the display device, a total of the bet amounts received in the process (a2).

4. The gaming machine according to claim 2, wherein the controller is further configured to execute the process of:
   (a6) receiving cancellation of the betting on each of a third set of bet objects which are on a single moving path of a fifth touch among the first set of bet objects in the bet object display area when the fifth touch drags the third set of bet objects in the bet object display area after it is determined that the touched position of the third touch is positioned in the cancellation operation area.

5. The gaming machine according to claim 1, wherein, the controller executes the process of: (a5) displaying, on the display device, a total of the bet amounts received in the process (a2).

6. The gaming machine according to claim 1, wherein the second image shows a number denoting the determined bet amount.

7. The gaming machine according to claim 1, wherein the second image shows a word "SELECTED."

8. The gaming machine according to claim 1, further comprising a memory storing a program,
   wherein the controller is configured to retrieve the program to execute the processes of (a1) and (a2).

* * * * *